May 16, 1939. K. RABE 2,158,776

WHEEL SUPPORTING MEANS FOR VEHICLES

Filed May 13, 1936

Karl Rabe
Inventor
By A. A. Wieke
Attorney

Patented May 16, 1939

2,158,776

UNITED STATES PATENT OFFICE 2,158,776

WHEEL SUPPORTING MEANS FOR VEHICLES

Karl Rabe, Stuttgart, Germany, assignor to Dr. ing. h. c. F. Porsche, K.-G., Stuttgart-Zuffenhausen, Germany, a company of Germany Application May 13, 1936, Serial No. 79,451
In Germany November 2, 1934

8 Claims. (Cl. 244—102)

This invention relates to wheel supporting means for vehicles, and more particularly to means for supporting a wheel from a vehicle as well as a vehicle upon a wheel.

An object of this invention is the provision of improved means for springing and supporting the wheels of a vehicle.

Another object of this invention is the provision of adjustable supporting means for the wheels of the vehicle.

A further object of this invention is the utilization of vehicle springing means as wheel adjusting means.

A more particular object of this invention is the utilization of vehicle springing means as means for lifting or retracting the wheels of a vehicle.

These and other features of the invention will be best understood and appreciated from the following description thereof, described for purposes of illustration in connection with the illustrative embodiment shown in the accompanying drawing in which:

Fig. 3 is a front view of a modified form of this invention while,

Fig. 4 is a side view taken along the lines IV—IV of Fig. 3.

This invention, as illustrated, may be used in its preferred embodiment in conjunction with aeroplane chassis, but it is not necessarily so limited.

Figures 1, 2:
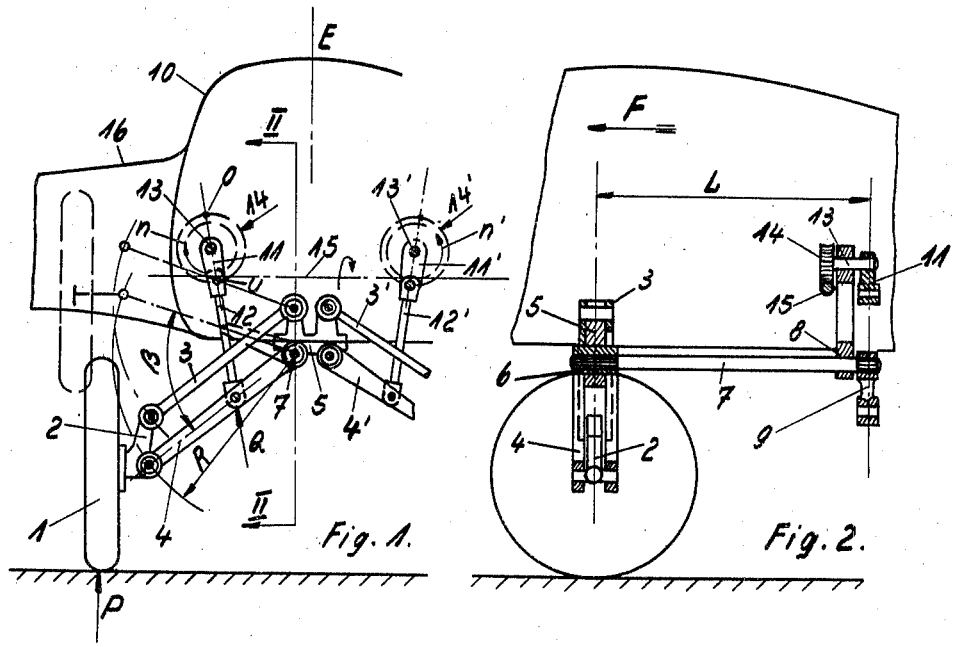
Fig. 1 is a front view of one form of supporting means, shown in conjunction with the chassis of a vehicle.
Fig. 2 is a side view of the same partially in cross section taken along the lines II—II of Fig. 1.

Figs. 1 and 2 illustrate one form of the invention. Referring to these figures, a wheel 1, or other ground engaging means such as a ski, or skid supported upon an axle arm 2 is connected by means, such as links 3 and 4, to a bracket 5 preferably, but not necessarily at the central vertical plane E on the vehicle chassis. By means, illustrated as a trunnion 6, spring means, such as a torsion rod 7, supported by a bearing 8, may be connected through a crank 9 to a second crank 11 through a link 12. The crank 11 is supported upon an axle 13 which may be positioned in the chassis 10. By means, such as a worm wheel 14 controlled by a worm on rod 15, the axle 13 is adapted to be adjusted. Similar means 3', 4', 11', 12', 13' and 14' positioned in another part of the vehicle, may be used to operate upon another wheel. The rod 15, turned by a hand crank or other means (not shown), may cooperate with both worm wheels 14, and 14' so that the adjusting means for both wheels may be simultaneously operated. The reference character F indicates the preferred direction of movement of the vehicle.

When the wheel is in its load bearing position as shown in Fig. 1, the force P, proportional to the weight of the vehicle, is transmitted through link 4 and operates as a force Q upon the torsion rod 7. In this extended position of the wheel supporting means, it will be noted that the cranks 9 and 11 and connecting rod 12 form a straight line, the crank 11 being in its dead-centre position U. Therefore, the force Q will not have any tendency to turn crank 11 and the crank 9 will act as a fixed abutment for the torsion rod 7. Accordingly, the wheel 1 is sprung from the vehicle chassis by means of the torsion rod which is twisted along its length L. It will be seen that in this position of the parts the vehicle is sprung as though the adjusting means were rigid.

In order to move the wheel into its retracted position as into the wing 16 of an aeroplane, (shown by dotted lines), the crank 11 is turned along the path n into an opposite dead-centre position O, so that the link 4, operating at a radius R, turns through the angle B. Again, as in the extended position, cranks 9 and 10 and link 11 form a straight line.

Figures 3, 4:
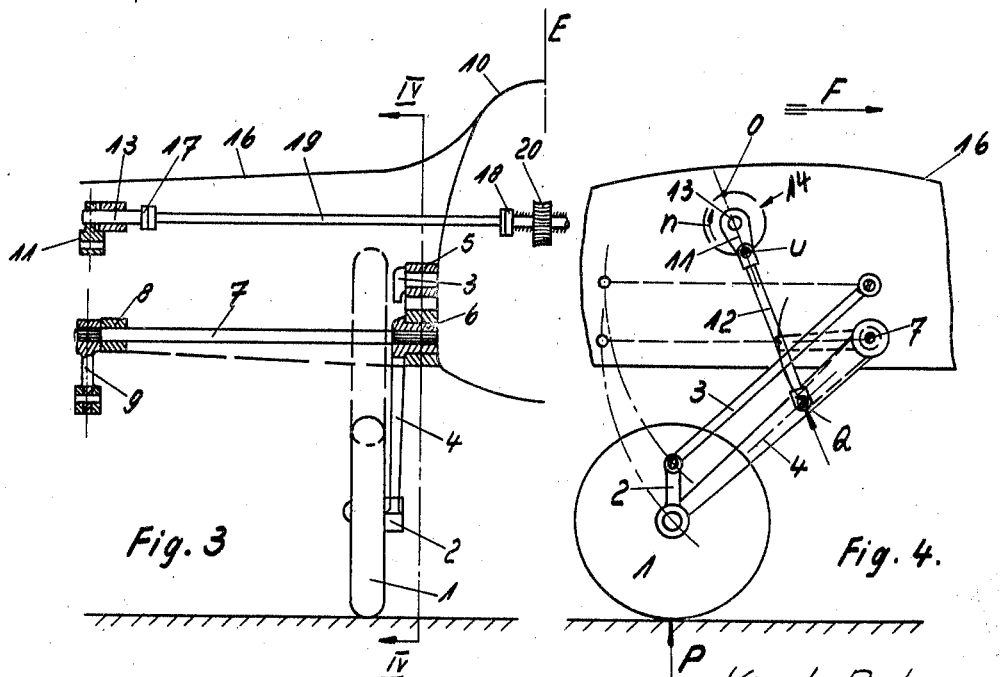

The modification shown in Figs. 3 and 4 operates upon the same principle as that in Figs. 1 and 2. In this embodiment, however, the adjustable abutment for the torsion rod is placed in the wing of the aeroplane and the wheel 1 swings about an axis at right angles to the axis of the vehicle so that its gauge remains unchanged. The controlling of the adjustable abutment 9 is done remotely through a shaft 19 connected to axle 13 and a worm wheel 20 preferably placed in the central vertical plane E by means shown at 17 and 18. This worm wheel may be turned by means (not shown), such means also controlling a worm wheel for the wheel on the other side of the vehicle. If preferred, however, the shaft 19 may be extended across to the other side for simultaneously controlling the other ground wheel, in which case only one worm wheel 20 and its operating means need be used.

While the road wheel will usually be in one or the other extreme position of adjustment it may of course for certain purposes be used in an intermediate position. In this event the shaft 19 in the form shown in Figs. 3 and 4 may also serve as a torsion bar, functioning in aid of and in series with torsion bar 7.

It will be obvious that applicant's springing arrangement is not only adapted to spring ground engaging means, but can also serve to resiliently support pontoon structure, without altering the principles of this invention.

While I have illustrated this invention as specifically applied to the control of aeroplane wheels, it is to be understood that this invention is adapted to be used with wheel supporting means of any vehicle. Furthermore, other changes and modifications as may occur to those skilled in the art may be made without departing from the scope of this invention, as expressed in the following claims.

I claim:

1. In combination, a frame, a ground engaging means, a torsion bar connecting said frame to said ground engaging means, and means for rotating one end of said torsion bar about its axis in such a manner that said frame is supported upon said ground engaging means or said ground engaging means is supported from said frame.

2. In a vehicle having a frame, in combination, a ground engaging means, means for pivotally supporting said ground engaging means and said frame about a horizontal axis, torsional spring means connected at one end to said pivotal means, adjustable abutment means connected to the other end of said spring means, and means for so adjusting said abutment means that said spring means causes said ground engaging means to support said vehicle or said vehicle to support said ground engaging means.

3. The combination according to claim 2 in which said spring means is a torsion bar.

4. In a vehicle having a frame, in combination, a ground engaging means, means for pivotally supporting said ground engaging means to said frame about a horizontal axis, torsional spring means connected at one end to said pivotal means, adjustable abutment means connected to the other end of said spring means, and means connected to said frame for so adjusting said abutment means that said spring means causes said ground engaging means to support said vehicle or said vehicle to support said ground engaging means.

5. In a vehicle having a frame, in combination, a ground engaging means, means for pivotally supporting said ground engaging means to said frame about a horizontal axis, torsional spring means connected at one end to said pivotal means, abutment means connected to the other end of said spring means, linkage means connecting said abutment means to said frame, and means for adjusting said linkage means, whereby said spring means is caused to spring said frame upon said ground engaging means or to carry said ground engaging means upon said frame.

6. The combination according to claim 5 in which said spring means is a torsion bar.

7. In a vehicle having a frame, in combination, a wheel, means for pivotally connecting said wheel to said frame, a first torsion spring attached at one end to said connecting means, a second torsion spring, means for adjustably attaching one end of said second torsion spring to said frame, means for respectively journaling the other ends of each of said torsion springs to said frame, crank arms respectively attached to journaled ends of each of said torsion springs, and a link interconnecting said crank arms, whereby in the dead-center position of one of said crank arms, only said first torsion spring is effective to resiliently support said wheel.

8. The combination according to claim 7, in combination with means for rotating the attached end of said second torsion spring for raising or lowering said wheel relative to said frame.

KARL RABE.